United States Patent Office 3,267,538
Patented August 23, 1966

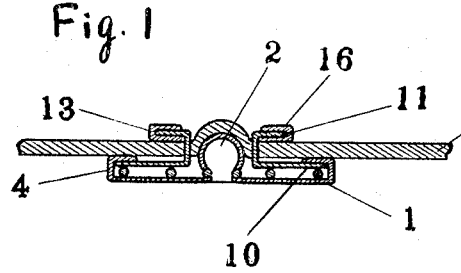
Fig. 1
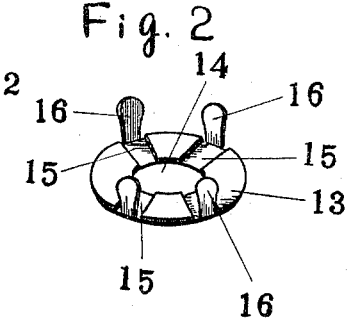
Fig. 2
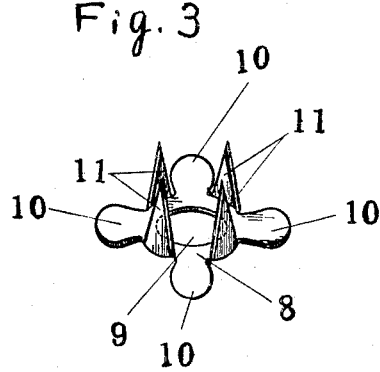
Fig. 3
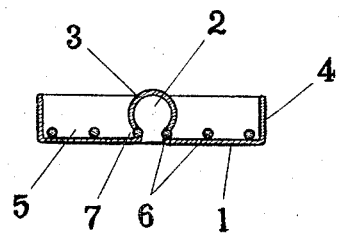
Fig. 4
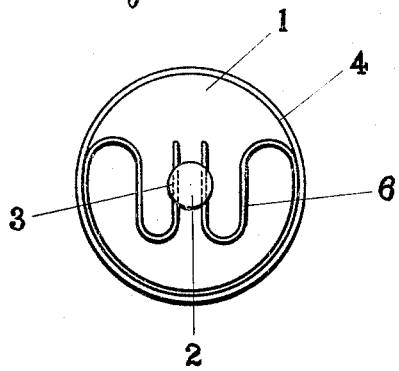
Fig. 5
Fig. 6

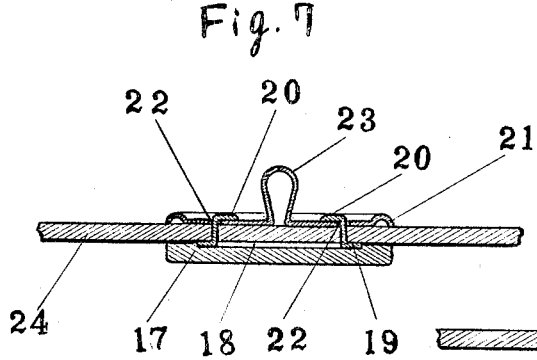
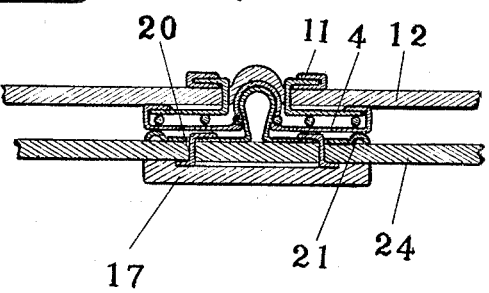
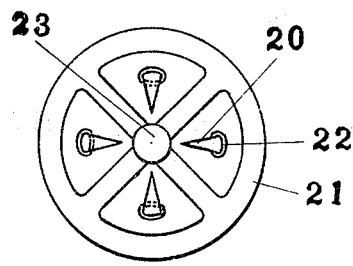
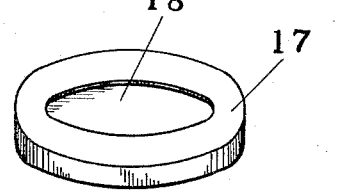
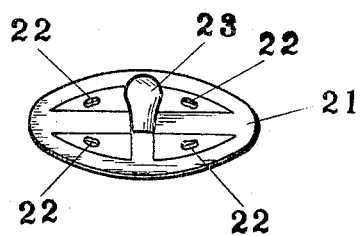
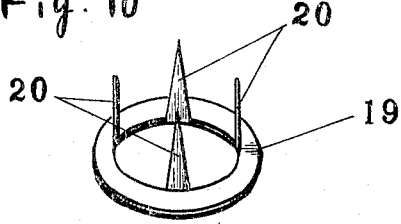

3,267,538
GRIP OR SNAP-ON FASTENERS
Hidenosuke Ishizaki, 289—46 Kitahata, Motoyama-cho, Higashinada-ku, Kobe, Japan
Filed June 10, 1964, Ser. No. 374,091
Claims priority, application Japan, Apr. 8, 1964, 39/27,357; Apr. 15, 1964, 39/29,353
1 Claim. (Cl. 24—96)

The present invention relates to grip or snap-on fasteners and, more particularly, to a grip fastener comprising a female fastening element which consists of a base plate and an inner washer contained in said base plate and having a plurality of projections adapted to pierce through a fabric or other material and, also, through the central opening of a washer temporarily attached to the other side of said fabric or material so as to be bent over said washer, and a male fastening element which consists of a base plate and an inner washer contained in said base plate and having a plurality of projections adapted to pierce through a fabric or other material and, also through the central opening of a washer held temporarily attached to the fabric so as to be hooked onto said washer on the other side of the fabric, said female fastening element being engageable with said male fastening element.

The present invention has as one of its objects to make the important parts of a snap-on fastener independent and separate, thereby rendering snap-on fasteners adaptable to mass production.

Another object of the invention is to make it possible to easily and quickly attach the fastening elements of such a snap-on fastener to fabric or other materials.

Another object is to secure an attractive appearance of the joint. Still another object is to provide means whereby such a fastener may be securely fastened to fabrics.

Conventional grip or snap-on fasteners have the disadvantages that because of their rather intricate construction, a high degree of skill, labor and time are required to attach the fastening elements to fabrics, that because they cannot be disassembled into less intricate parts, these fasteners are not adaptable to mass production and, accordingly, are rather costly, that they are not satisfactorily attractive, and that since they are attached to fabrics by means of thread, these fasteners cannot remain attached over months of use. With the snap-on fastener of the present invention, these disadvantages are completely absent.

The present invention will be further described in detail, reference being had to the accompanying drawings, in which:

FIG. 1 is a cross-sectional view of the female fastening element of the snap-on fastener of the invention as attached to a fabric;

FIG. 2 is a perspective view of the hook washer of the female fastening element of said snap-on fastener;

FIG. 3 is a perspective view of the inner washer of the female fastening element of said snap-on fastener;

FIG. 4 is a cross-sectional view of the base plate of the female fastening element of said snap-on fastener;

FIG. 5 is a plan view of the base plate of said female fastening element;

FIG. 6 is a perspective view of the inner washer and base plate of said female fastening element with said parts in engagement;

FIG. 7 is a cross-sectional view of the male fastening element of the snap-on fastener of the invention as attached to a fabric;

FIG. 8 is a plan view of the male fastening element of said snap-on fastener;

FIG. 9 is a perspective view of the hook-on washer of said male fastening element;

FIG. 10 is a perspective view of the inner washer of said male fastening element;

FIG. 11 is a perspective view of the base plate of said male fastening element; and FIG. 12 is a cross-sectional view of the snap-on fastener of the invention with its male element brought into engagement with its female element.

Referring, now, to FIGS. 1 to 6, a base plate 1 is circular in shape, having a dome-like wall 3 extending about its center and a flexible circumferential wall 4 disposed around said dome-like wall 3, leaving a clearance 5 between said dome-like wall 3 and said circumferential wall 4 for receiving an inner washer 8. The inner side of said dome-like wall 3 being recessed to provide a space 2 which opens downwardly and centrally with respect to bottom wall 7. A spring 6 is disposed on the bottom wall 7 of said base plate 1 so as to impart elasticity to said space 2. A round inner washer 8 has a central opening 9 through which said dome-like wall 3 can be fitted and, also, has a plurality of extending edges or projections 10. Between each adjacent two of said projections 10 rises a bendable tapered lobe or projection. Thus, the dome-like wall 3 of said base plate 1 is fitted through the opening 9 of the inner washer 8 so that the washer 8 is removably fitted into the clearance 5 of said base plate and the projections 10 of said inner washer 8 are engaged with the circumferential wall 4. A washer 13 to be fastened to a fabric 12 is circular in shape and has an opening 14 in which said projections 11 are to be inserted, a suitable number of grooves 15 formed on its surface and a suitable number of hooks 16 formed integrally with said washer 13 and extending upwardly from the outer ends of said grooves. The projections 11 of said inner washer 8 fitted removably in said base plate 1 are adapted to pierce through the fabric from the reverse side and, also, through the opening 14 of said washer 13 attached securely on to the surface of said fabric 12. The outer ends of said projections 11 are then bent over to fit into the grooves 15 of said washer 13 and, lastly, the hooks 16 of said washer 13 are bent over the projections 11 to lock the latter in position.

Referring, now, to FIGS. 7 to 12, a round base plate 17 has, on one side, a central recess 18 into which a round inner washer 19 can be removably fitted. The inner washer 19 is provided with projections 20 integrally formed with and extending upwards from the edge of its central opening. These projections are adapted to pierce through a fabric 24 from the reverse side. A round washer 21 attached to the surface of said fabric 24 has a central recess 23 and, also, the same number of holes 22 as said projections 20 so that the projections 20 piercing the fabric 24 may pass through the holes 22, to be bent inwardly over said washer 21 for locking effect. Thus, in the recess 2 of the female fastening element attached to the fabric 12 is fitted the raised portion 23 of the male fastening element attached to the fabric 24. It is to be understood that the inner washer 19 is inserted into the recess of the base plate 17 and, then, locked securely in position by means of an adhesive or other material.

It will be apparent from the above description that the base plate of the female fastening element of this snap-on fastener consists of a projecting wall and a circumferential wall and is completely independent of other parts or elements. The circumferential wall of said base plate is bendable so that the inner washer can be readily mounted or removed simply by bending the circumferential wall. The inner washer of the female fastening element consists of projections and lobes and, as such, is completely independent of other elements or parts. The opening of said inner washer is slightly larger than the circumference of the projecting wall of said base plate so that the wall can be easily fitted into said opening. The lobes are provided to facilitate bending and locking of said circumferential wall. The bendable projections formed integrally with an extending upwards from said inner washer are tapered so as to easily pierce through a fabric and, simply by bending the outer end of said projections, the washer located on the other side of the fabric can be easily, securely, and removably attached to the fabric. The hook washer of the female fastening element consists of hooks and grooves, and, as such, is completely independent of other parts. The central opening of said washer is adapted so that said projections may freely pass through. The grooves provided in said hook washer serve the purpose of insuring correct positioning of said projections as they are bent over and the hooks, which are also bendable, make it possible to easily and quickly lock the inner washer in position on the fabric. Thus, since the two sets of bendable parts, i.e. said projections and hooks, are bent over in the grooves, the person using or coming in contact with the fastener is successfully protected against injuries. The base plate of the male fastening element has a central recess on its upper side and, as such, is completely independent of other parts. By means of an adhesive or other material, the inner washer may be easily fitted into said recess. The inner washer of the male fastening element is an independent element having projections and being adapted to fit into the recess. The bendable projections of said inner washer are tapered so that they can easily and quickly pierce through a fabric, and simply by bending the outer ends of the projections, it is possible to quickly and positively lock the hook washer. The hook washer of the male fastening element consists of an opening and a recess and, as such, is independent of other parts. The opening registers with said projections so that the latter may easily pass through the former. It will be apparent from the above description that the snap-on fastener of the present invention consists of independent parts which respectively are easily removable so that it can be easily and quickly attached to or detached from fabrics. Furthermore because of the independence of various parts, the snap-on fastener of the present invention may be manufactured more easily and at lower cost than integral fastener of the conventional type which consists of two integral elements.

What I claim is:

A snap fastener comprising a female fastening element comprising a base plate having a snap fastener socket therein and an inner washer contained in said base plate and having bendable projections thereon adapted to be pierced through an associated fabric and also through the central opening of a tab-carrying washer positioned on the other side of the fabric so that the outer ends of said projections may be bent over the tab-carrying washer to secure the parts of the female fastening element together, and a male fastening element comprising a base plate having a recess, an inner washer contained in the said recess and having bendable projections adapted to be pierced through an associated fabric and also through the central opening of an associated washer disposed on the other side of the fabric and having a snap fastener stud thereon so that the outer ends of said projections may be bent over the stud-carrying washer to secure the parts of the male fastening element together, said tab-carrying washer having a plurality of grooves in its upper surface positioned and dimensioned to receive the bent over projections of the female fastening element inner washer and said tabs being positioned at the outer ends of the said grooves and adapted to be bent over the last mentioned projections to conceal same, said snap fastener stud and socket being dimensioned so as to readily snap together.

References Cited by the Examiner

UNITED STATES PATENTS

| 290,774 | 12/1883 | Ivins et al. | 24—94 |
| 329,744 | 11/1885 | Ivins | 24—94 |
| 1,476,147 | 12/1923 | Carr | 24—216 |
| 1,841,739 | 1/1932 | King | 24—95 |

FOREIGN PATENTS

| 445,193 | 8/1912 | France. |
| 545,825 | 1/1922 | France. |
| 572,373 | 2/1924 | France. |
| 25,502 | 1902 | Great Britain. |
| 770,974 | 3/1957 | Great Britain. |

WILLIAM FELDMAN, *Primary Examiner.*

D. GRIFFIN, *Assistant Examiner.*